US012652358B2

(12) United States Patent
Hori

(10) Patent No.: US 12,652,358 B2
(45) Date of Patent: Jun. 9, 2026

(54) ARRANGEMENT OF OPERATION UNIT IN IMAGE FORMING APPARATUS

(71) Applicant: CANON KABUSHIKI KAISHA, Tokyo (JP)

(72) Inventor: Hirofumi Hori, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/944,955

(22) Filed: Nov. 12, 2024

(65) Prior Publication Data

US 2025/0159086 A1      May 15, 2025

(30) Foreign Application Priority Data

Nov. 14, 2023      (JP) ................................. 2023-193850

(51) Int. Cl.
| | |
|---|---|
| *H04N 1/00* | (2006.01) |
| *G03G 15/00* | (2006.01) |
| *G03G 21/16* | (2006.01) |
| *H04N 1/23* | (2006.01) |

(52) U.S. Cl.
CPC ..... *H04N 1/00254* (2013.01); *G03G 15/5016* (2013.01); *G03G 15/6552* (2013.01); *G03G 21/1619* (2013.01); *G03G 21/1647* (2013.01); *H04N 1/00631* (2013.01); *H04N 1/2315* (2013.01)

(58) Field of Classification Search
CPC ........... G03G 15/5016; G03G 15/6552; G03G 21/1619; G03G 21/1647; H04N 1/00254; H04N 1/00631; H04N 1/2315
See application file for complete search history.

(56) References Cited

U.S. PATENT DOCUMENTS

| | | | |
|---|---|---|---|
| 8,107,852 B2 * | 1/2012 | Ito | G03G 15/60 399/125 |
| 2010/0091315 A1 | 4/2010 | Shiraki | |
| 2012/0099888 A1 * | 4/2012 | Ohgi | G03G 15/6552 399/107 |
| 2017/0190193 A1 * | 7/2017 | Migita | B41J 29/02 |
| 2018/0077307 A1 | 3/2018 | Sawada | |
| 2020/0278632 A1 * | 9/2020 | Mori | G03G 15/6552 |
| 2020/0285188 A1 | 9/2020 | Okamoto | |

FOREIGN PATENT DOCUMENTS

| | | |
|---|---|---|
| JP | 2008065353 A | 3/2008 |
| JP | 2022157991 A | 10/2022 |

OTHER PUBLICATIONS

Extended European Search Report issued in European Appln. No. 24212570.6 mailed Apr. 9, 2025.

* cited by examiner

*Primary Examiner* — Sandra Brase
(74) *Attorney, Agent, or Firm* — ROSSI, KIMMS & McDOWELL LLP

(57) ABSTRACT

A supporting member supports an image reading device. The image reading device is movable between a first position at which a front side of the image reading device is close to an image forming unit and a second position at which a front side of the image reading device is spaced apart from the image forming unit. A first end portion of an operation unit protrudes outward of the image forming unit from one side surface. A second end portion of the operation unit that opposes the first end portion is positioned on an inner side of the image forming unit relative to one side surface of the image forming unit.

13 Claims, 14 Drawing Sheets

F I G. 1
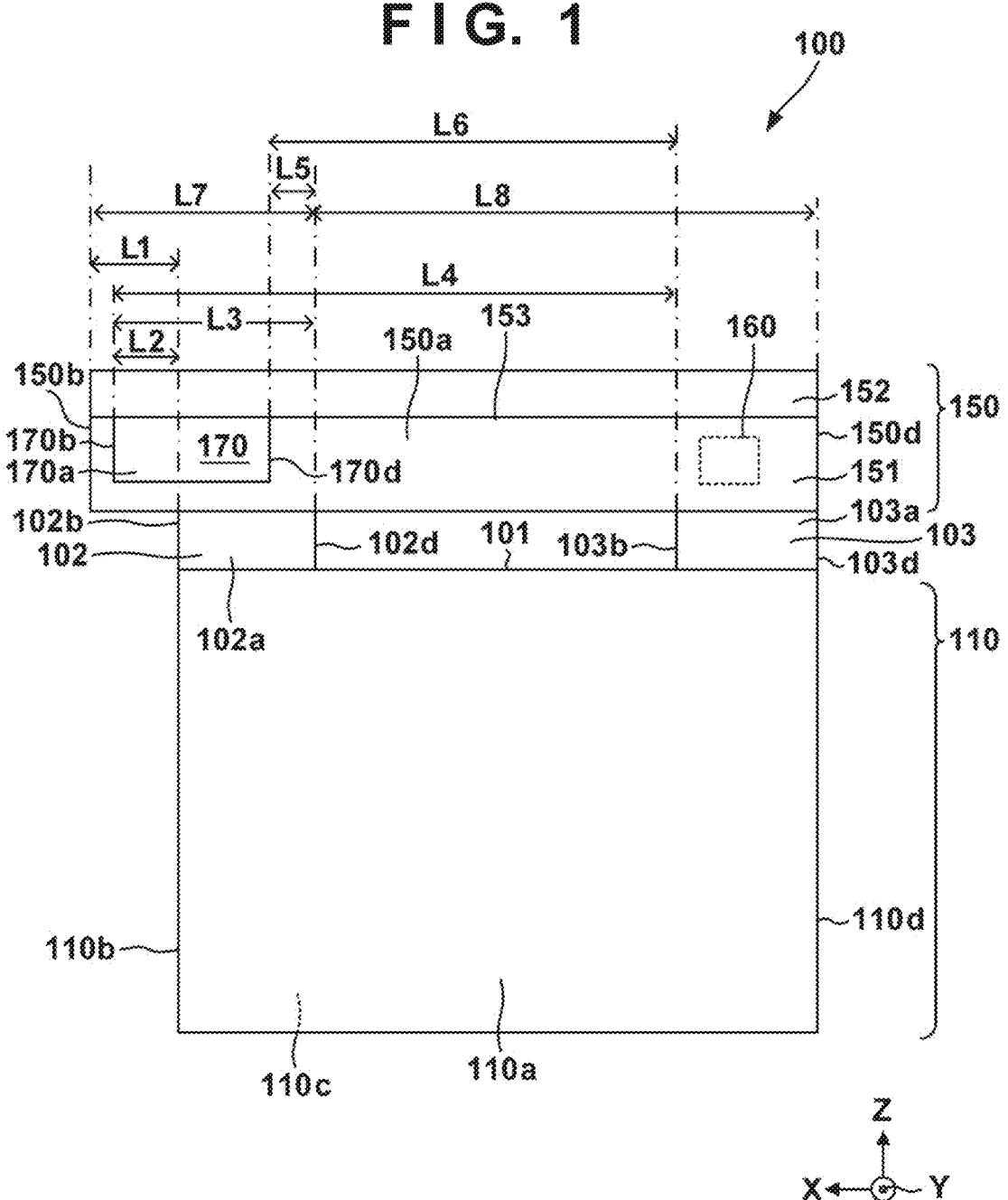

F I G.  6
100
170 { 170a
170f
152
151
600 {
601
602
603
604
605
606
102                    103
110
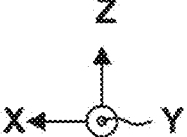

F I G. 9
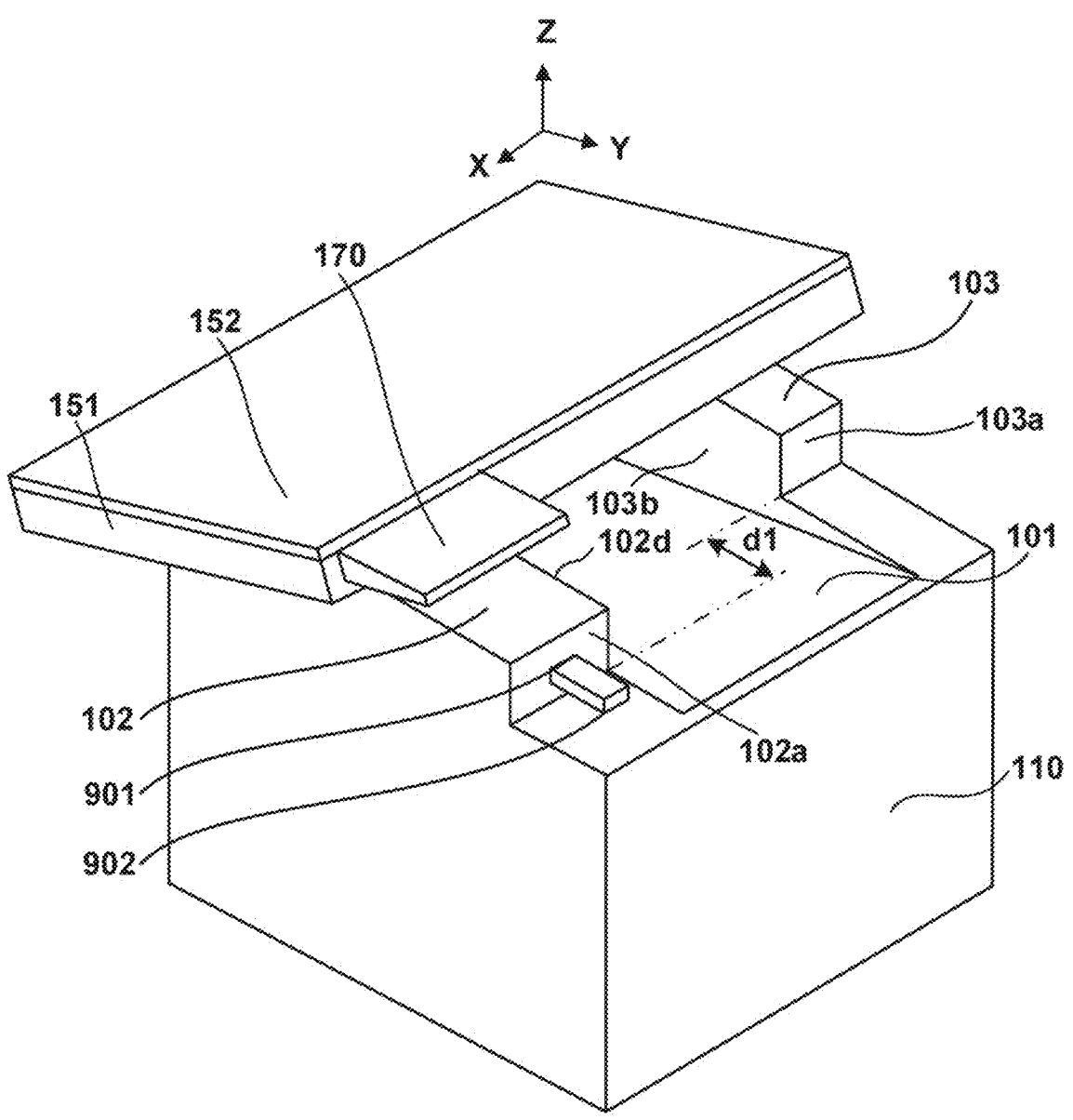

F I G. 11
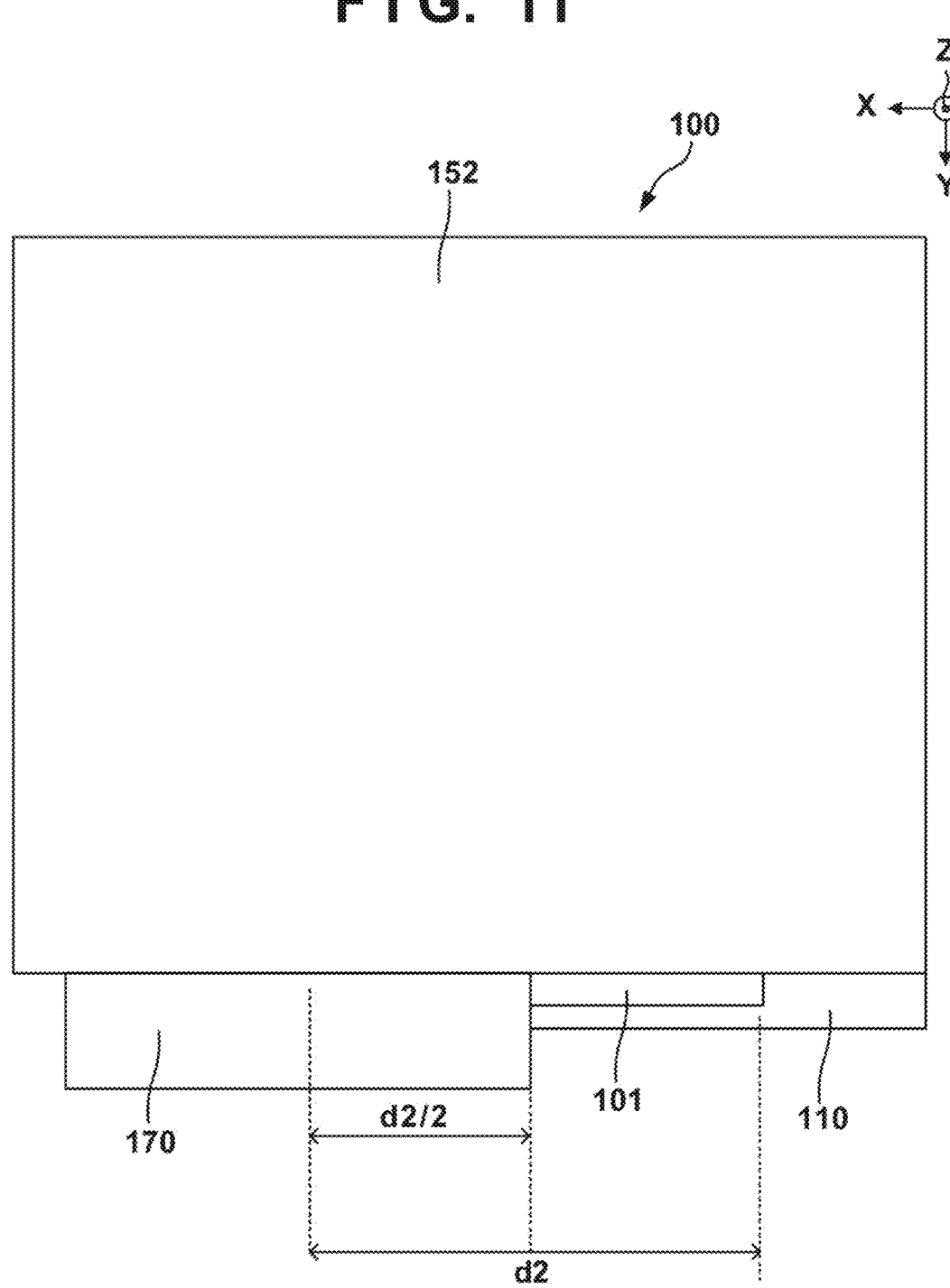

FIG. 14

ARRANGEMENT OF OPERATION UNIT IN IMAGE FORMING APPARATUS

BACKGROUND OF THE INVENTION

Field of the Invention

The present invention relates to arrangement of an operation unit in an image forming apparatus.

Description of the Related Art

There are known image forming apparatuses in which an image forming unit forms, on a sheet, an image read by an image reading device, and the sheet is discharged to a stacking unit provided above the image forming unit. According to Japanese Patent Laid-Open No. 2022-157991, an image forming apparatus that includes an image reading device that is rotatably attached to an image forming unit is proposed. This makes it possible to realize both a decrease in the size of the image forming apparatus and the ease of removing discharged sheets.

In conventional image forming apparatuses, an operation unit is disposed above and covers a stacking unit. For this reason, it has not been easy for the user to visually recognize discharged sheets due to the operation unit blocking the view. In particular, small sheets are not visible to the user. There may be cases where the operation unit prohibits the user from removing a sheet. A decrease in the size of the operation unit may make it easy to visually recognize a sheet discharged to the stacking unit. However, in exchange for that, the operability of the operation unit may decrease, and it may be difficult to visually recognize information displayed on the operation unit.

SUMMARY OF THE INVENTION

The present disclosure provides an image forming apparatus comprising: an image reading device that reads a document; an image forming unit that is provided below the image reading device, and forms an image on a sheet; a supporting member that is provided between the image reading device and the image forming unit in a height direction of the image forming apparatus, and supports the image reading device disposed above the image forming unit; a stacking unit that is provided between the image reading device and the image forming unit in the height direction of the image forming apparatus, and is disposed adjacent to the supporting member, and on which the sheet discharged from the image forming unit is stacked; a discharge unit that is provided in the image forming unit, and is configured to discharge the sheet from the image forming unit to the stacking unit; and an operation unit that is configured to accept input for operating at least one of the image forming unit and the image reading device, and is supported by the image reading device, on a front side of the image forming apparatus. The supporting member supports the image reading device such that the image reading device is movable between a first position at which a front side of the image reading device is close to the image forming unit and a second position at which the front side of the image reading device is spaced apart from the image forming unit. A first end portion of the operation unit protrudes outward of the image forming unit from one side surface of the image forming unit, in a width direction of the image forming apparatus. A second end portion of the operation unit that opposes the first end portion is positioned on an inner side of the image forming unit relative to the one side surface of the image forming unit, in the width direction of the image forming apparatus.

Further features of the present invention will become apparent from the following description of exemplary embodiments (with reference to the attached drawings).

BRIEF DESCRIPTION OF THE DRAWINGS

FIG. 1 is a front view illustrating an image forming apparatus.

FIG. 6 is a front view illustrating a state where an image reading device is open.

FIG. 9 is a perspective view showing the state where image reading device is open.

FIG. 11 is a plan view illustrating the variation.

FIG. 14 is a perspective view illustrating a variation.

DESCRIPTION OF THE EMBODIMENTS

Figure 2:
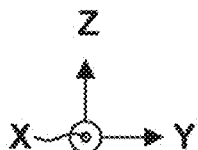
FIG. 2 is a left side view illustrating the image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

1. External Structure of Image Forming Apparatus 100

Figure 3:
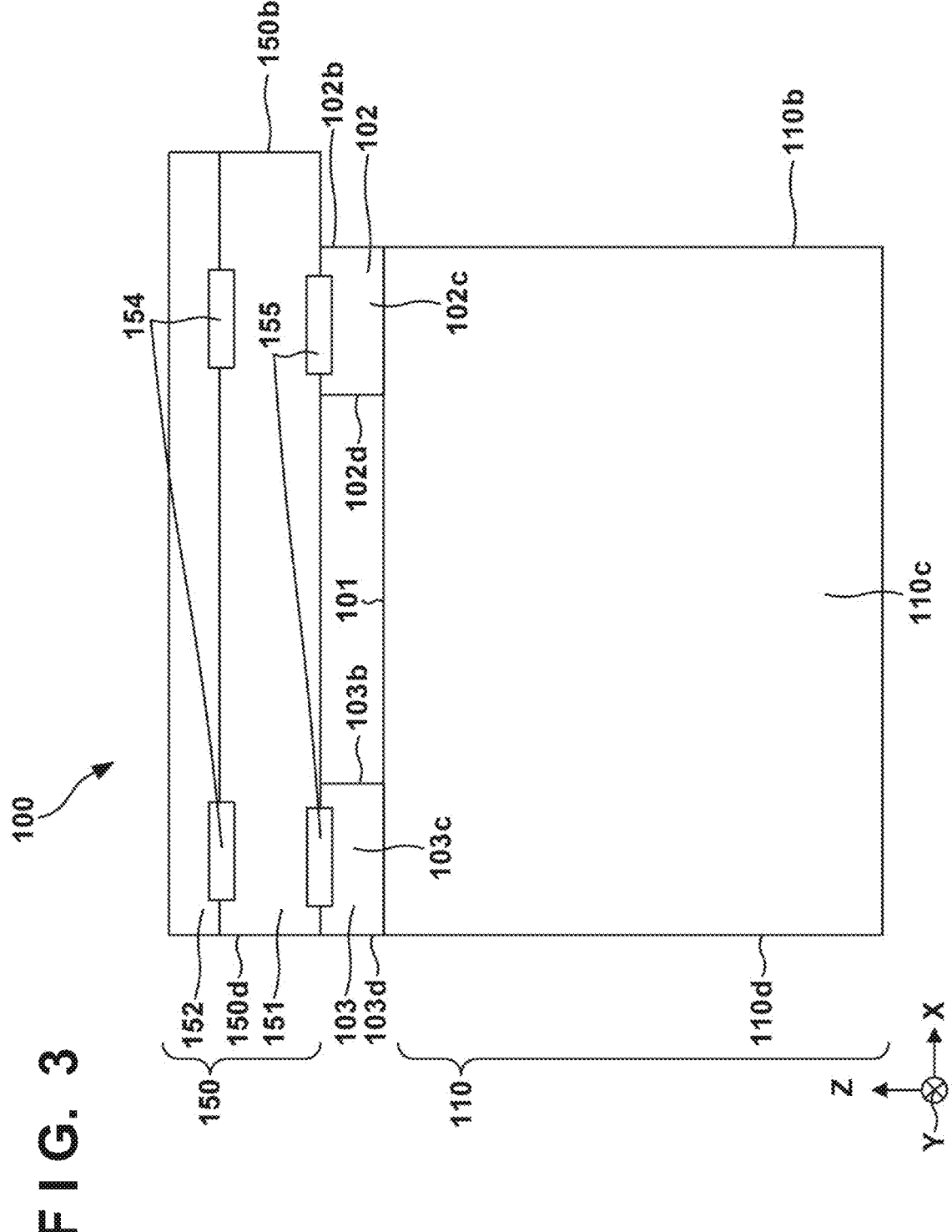
FIG. 3 is a rear view illustrating the image forming apparatus.
Figure 4:
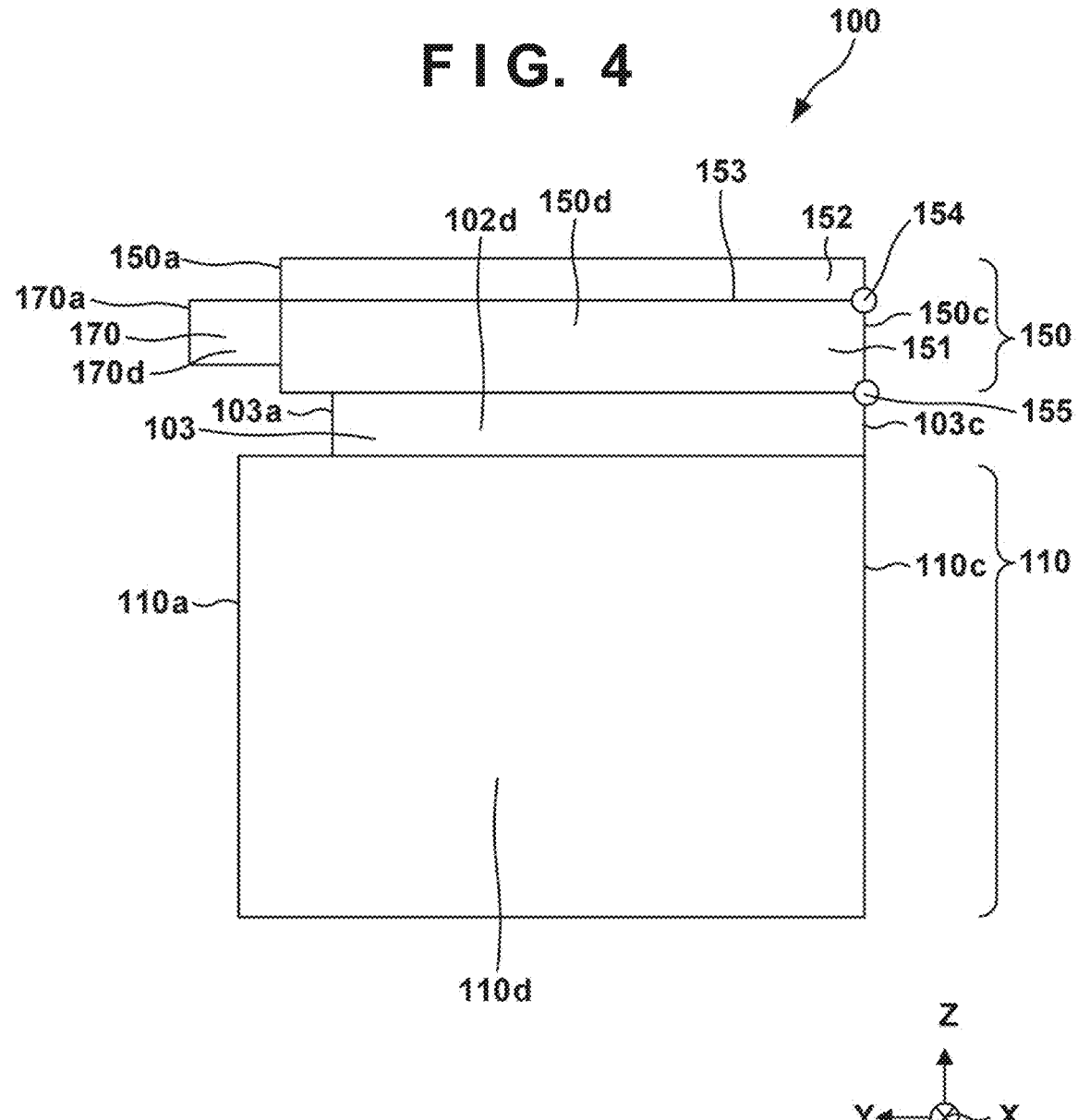
FIG. 4 is a right side view illustrating the image forming apparatus.
Figure 5:
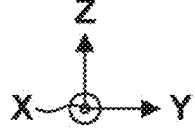
FIG. 5 is a schematic cross-sectional view illustrating the interior of an image forming unit.

FIG. 1 is a front view showing the front side of an image forming apparatus 100. FIG. 2 is a side view showing the left side of the image forming apparatus 100. FIG. 3 is a rear view showing the rear side of the image forming apparatus 100. FIG. 4 is a right side view showing the right side of the image forming apparatus 100. FIG. 5 is a schematic cross-sectional view for illustrating the internal structure of an image forming unit 110. The X direction represents the width direction of the image forming apparatus 100. The Y direction represents the depth direction of the image forming apparatus 100. The Z direction represents the height direction of the image forming apparatus 100.

As shown in FIGS. 1 to 4, the image forming apparatus 100 includes the image forming unit 110 and an image reading device 150. The image forming unit 110 forms images on sheets S based on image data of a document obtained by the image reading device 150. As shown in FIGS. 1 to 4, the case of the image forming unit 110 has a front surface 110*a*, a left side surface 110*b*, a rear surface 110c (FIG. 3), and a right side surface 110d. A left beam 102 and a right beam 103 are provided on the upper side of the image forming unit 110. The left beam 102 and the right beam 103 function as a supporting member that supports the image reading device 150. The case of the left beam 102 has a front surface 102a, a left side surface 102b, a rear surface 102c (FIG. 3), and a right side surface 102d. The case of the right beam 103 has a front surface 103a, a left side surface 103b, a rear surface 103c (FIG. 3), and a right side surface 103d. A discharge stacking unit 101 on which sheets S discharged from the image forming unit 110 are stacked is provided between the left beam 102 and the right beam 103. As shown in FIG. 5, the stacking surface of the discharge stacking unit 101 may have a downward slope surface in a region extending from the front surface 110a of the image forming unit 110 to the rear surface 110c.

The image reading device 150 includes an image reading unit 151, a cover 152, a platen glass 153, an image sensor 160, and the like. The platen glass 153 is disposed on the upper side of the image reading unit 151. The cover 152 for exposing or protecting the platen glass 153 is provided above the platen glass 153. As shown in FIG. 3, the image reading unit 151 and the cover 152 are coupled to each other by hinges 154 provided in the vicinity of the rear surface 150c. The hinges 154 enable the cover 152 to rotate relative to the image reading unit 151. Note that a hinge 155 is provided between the image reading device 150 (image reading unit 151) and the left beam 102. Another hinge 155 is also provided between the image reading device 150 (image reading unit 151) and the right beam 103. The hinges 155 enable the image reading device 150 to rotate relative to the image forming unit 110. An image reading operation will be described in detail later with reference to FIG. 5. The image reading device 150 has a front surface 150a, a left side surface 150b, a rear surface 150c (FIG. 3), and a right side surface 150d.

An operation unit 170 is provided on the front surface 150a of the image reading unit 151. The operation unit 170 has a front surface 170a, a left side surface 170b, and a right side surface 170d. Note that, in a case where the case of operation unit 170 is integrated with the case of the image reading unit 151, the operation unit 170 does not need to have a rear surface.

2. Internal Structure and Operations of Image Forming Unit

According to FIG. 5, a feeding cassette 13 is provided below the image forming unit 110, and can accommodate a large number of sheets S. An elevating plate 14 can elevate a large number of sheets S. A feeding roller 11 and a separation pad 12 separate a sheet S from a plurality of sheets S taken out from the feeding cassette 13, and feed the sheet S to a conveyance path P1.

A photosensitive drum 1 is an image carrying member that rotates while carrying an electrostatic latent image or a toner image. A charging member 2 charges the surface of the photosensitive drum 1 such that the surface potential of the photosensitive drum 1 is a uniform potential. An exposure light source 3 outputs a laser beam 4 modulated based on image data, and scans the laser beam 4 over the photosensitive drum 1. Accordingly, an electrostatic latent image is formed on the surface of the photosensitive drum 1.

A developing roller 5 develops the electrostatic latent image using toner and forms a toner image. A transfer roller 6 faces the photosensitive drum 1, and transfers the toner image from the photosensitive drum 1 onto the sheet S. A fixing unit 17 includes a heating roller 15 and a pressing roller 16. The heating roller 15 heats the sheet S and the toner image, and the pressing roller 16 pressurizes the sheet S and the toner image. Accordingly, the toner image is fixed to the sheet S. A discharge roller 18 discharges the sheet S to the upper side of the discharge stacking unit 101.

Note that the image forming unit 110 may employ an image forming method different from the electrophotographic method. An inkjet recording method may be employed, for example.

3. Structure and Operations of Image Reading Device

As shown in FIG. 1 and the like, the image reading device 150 is disposed above the discharge stacking unit 101. The image reading device 150 includes the image reading unit 151, the platen glass 153, and the cover 152. The image reading unit 151 causes the image sensor 160 to read a document placed on the platen glass 153, generates image data, and outputs the image data to the image forming unit 110. This realizes copy of the document. The platen glass 153 is a translucent plate having a light-transmitting property. As suggested in FIGS. 2 and 4, the cover 152 can rotate using the hinges 154 as a rotation shaft, and move between a position at which the platen glass 153 is exposed and a position at which the platen glass 153 is protected.

The user opens the cover 152, places a document on the platen glass 153, and gives an instruction to read the document through the operation unit 170. In accordance with this, the image reading unit 151 illuminates the document, and causes the image sensor 160 to read the document while moving the image sensor 160 in the X direction. The image reading unit 151 may transmit image data of the document as electronic data to an external computer or store the image data in a removable medium, instead of transmitting the image data to the image forming unit 110.

4. Supporting Structure of Image Reading Device

As shown in FIGS. 1 to 5, the left beam 102 is provided on the upper left side of the image forming unit 110. The right beam 103 is provided on the upper right side of the image forming unit 110. The image reading device 150 is disposed on the upper side of the left beam 102 and the right beam 103. That is to say, the left beam 102 and the right beam 103 support the image reading device 150 disposed above the image forming unit 110.

If the size of the image forming apparatus 100 is reduced, the width of the image reading device 150 is larger than the width of the image forming unit 110. As shown in FIG. 1, the left side surface 150b of the image reading device 150 protrudes in the leftward direction (X direction) beyond the left side surface 110b of the image forming unit 110.

As shown in FIG. 1, the distance between the left side surface 110b of the image forming unit 110 and the left side surface 150b of the image reading device 150 in the X direction is L1. Therefore, L1 denotes the amount of protrusion of the image reading device 150 with respect to the image forming unit 110. L2 denotes the distance between the left side surface 110b of the image forming unit 110 and the left side surface 170b of the operation unit 170. L3 denotes the distance between the left side surface 170b of the operation unit 170 and the right side surface 102d of the left beam 102. L4 denotes the distance between the left side surface 170b of the operation unit 170 and the left side surface 103b of the right beam 103. L3 is shorter than L4. L5 denotes the distance between the right side surface 170d of the operation unit 170 and the right side surface 102d of the left beam 102. L6 denotes the distance between the right side surface 170d of the operation unit 170 and the left side surface 103b of the right beam 103. L5 is shorter than L6. L7 denotes the distance between the left side surface 150b of the image reading device 150 and the right side surface 102d of the left beam 102. L8 denotes the distance between the right side surface 150d of the image reading device 150 and the right side surface 102d of the left beam 102. L7 is shorter than L8.

5. Holding Mechanism

Figure 7:
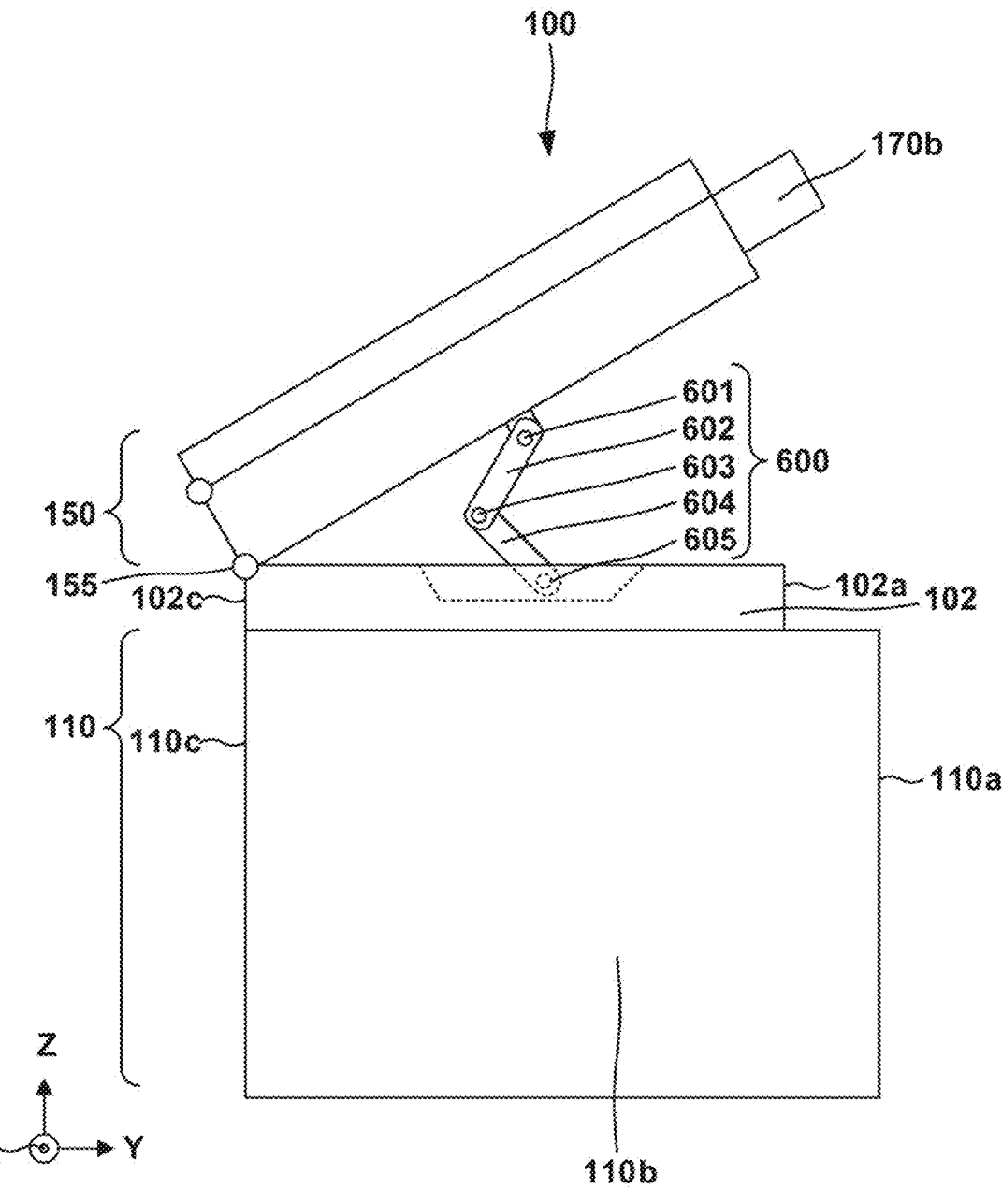
FIG. 7 is a left side view illustrating the state where the image reading device is open and a holding mechanism.

FIG. 6 is a front view showing a state where the image reading device 150 has moved to an open position relative to the image forming unit 110 using the hinges 155. FIG. 7 is a left side view showing a state where the image reading device 150 has moved to the open position relative to the image forming unit 110 using the hinges 155. In FIG. 6, a bottom surface 170f of the operation unit 170 is visible.

A holding mechanism 600 is a mechanism for holding and fixing the image reading device 150 at the open position. The holding mechanism 600 is provided on the left beam 102. When the image reading device 150 is moved to a closed position, the holding mechanism 600 is folded and is accommodated in a groove-like housing space 606 provided in the left beam 102.

The holding mechanism 600 includes a lower coupling rod 604, an upper coupling rod 602, fixed-end rotation shafts 601 and 605, and a free-end rotation shaft 603. The fixed-end rotation shaft 601 is fixed to the bottom surface side of the image reading device 150 and passes through the upper coupling rod 602. Accordingly, the upper coupling rod 602 pivots about the fixed-end rotation shaft 601. The lower end of the upper coupling rod 602 and the upper end of the lower coupling rod 604 overlap each other, and the free-end rotation shaft 603 passes therethrough. The upper coupling rod 602 and the lower coupling rod 604 pivot relative to each other about the free-end rotation shaft 603. The fixed-end rotation shaft 605 passes through the lower end of the lower coupling rod 604. The lower coupling rod 604 pivots about the fixed-end rotation shaft 605. The fixed-end rotation shaft 605 is fixed to a left wall surface and a right wall surface that define the housing space 606.

As shown in FIG. 7, the holding mechanism 600 may have a structure similar to an open-type link mechanism. Note that it is sufficient that the holding mechanism 600 is a mechanism that can hold and fix the image reading device 150. For this reason, the holding mechanism 600 may be a mechanism different from the open-type link mechanism. The holding mechanism 600 may be realized by an oil damper or the like.

When the image reading device 150 is at the open position, the upper coupling rod 602 and the lower coupling rod 604 are fixed, and the image reading device 150 is maintained at the open position. At this time, the upper coupling rod 602 and the lower coupling rod 604 may be in a braced state. When the image reading device 150 is at the closed position, the upper coupling rod 602 and the lower coupling rod 604 fold together, and are stored in the housing space 606 in the left beam 102.

7. Operation Unit

Figure 8:
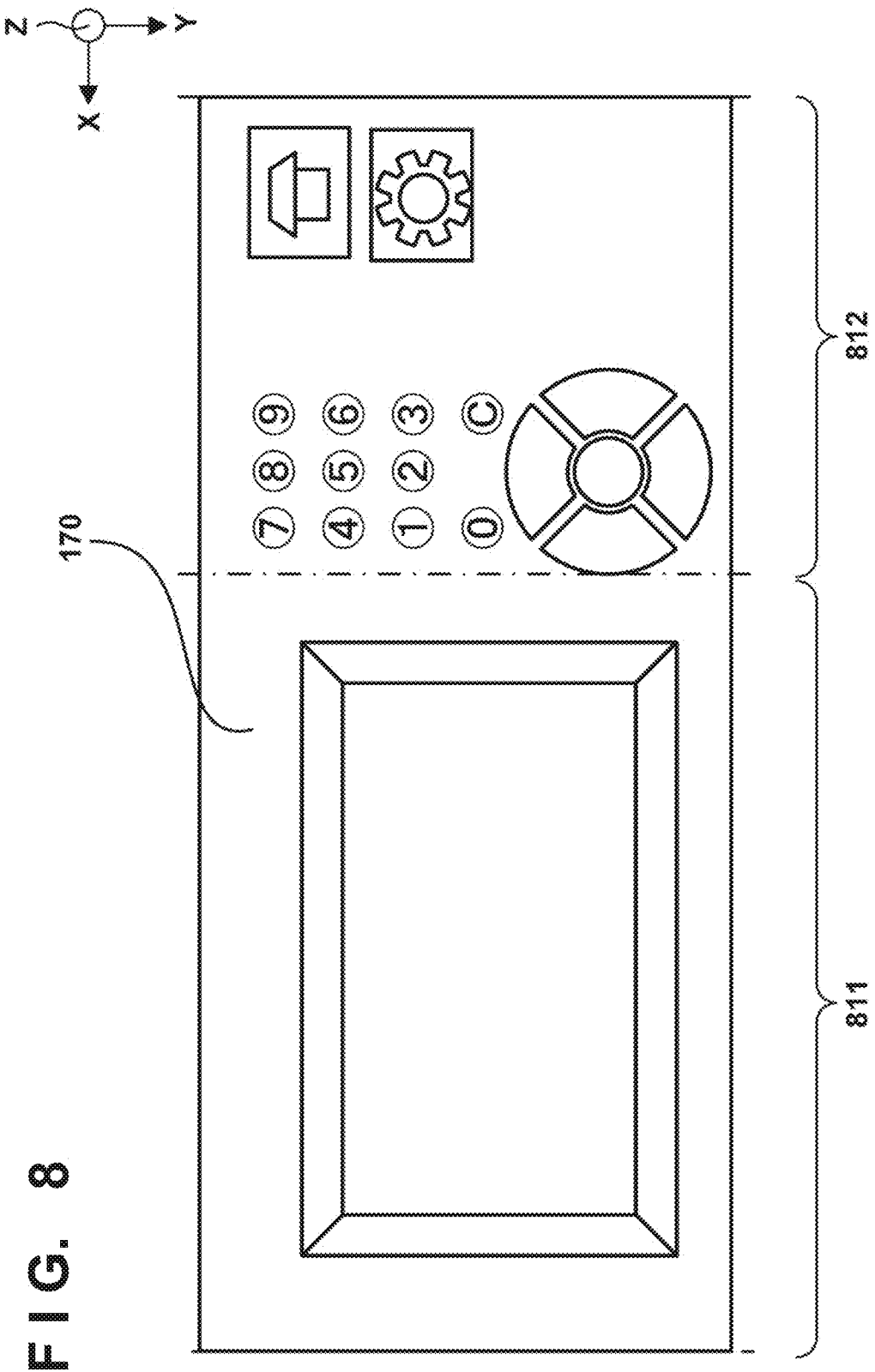
FIG. 8 is a diagram illustrating an operation unit.

FIG. 8 shows the operation unit 170 of the image forming apparatus 100. The operation unit 170 for operating the image forming apparatus 100 may be formed integrally with the image reading unit 151. The operation unit 170 includes a display region 811 and an operation region 812. The display region 811 includes a liquid crystal display device, an organic EL display device, or the like. The operation region 812 includes a hardware switch or a software switch (e.g., a touch sensor).

As shown in FIG. 1, the left side surface 170b of the operation unit 170 is located about L2 to the left of the left side surface 110b of the image forming unit 110. Here, 0<L2≤L1.

FIG. 9 is a perspective view of the image forming apparatus 100 in a state where the image reading device 150 is open relative to the image forming unit 110. A USB connector 901 is provided on the front surface 102a of the left beam 102. USB is an abbreviation for Universal Serial Bus. In this example, a removable memory 902 is connected to the USB connector 901. The removable memory 902 stores, for example, image data of a document obtained by the image reading device 150 or image data to be printed. Note that, in a state where the image reading device 150 is in a closed state relative to the image forming unit 110, the USB connector 901 is positioned below the operation unit 170.

The front surface 103a of the right beam 103 is positioned rearward of (on the −Y direction side relative to) the front surface 102a of the left beam 102. The distance between the front surface 103a of the right beam 103 and the front surface 102a of the left beam 102 in the Y direction is denoted by d1. This makes it easier for the user to remove the sheets S from the discharge stacking unit 101. In particular, for a right-handed user, the sheets S stacked in the discharge stacking unit 101 may be easily accessed.

As shown in FIG. 9, the left stacking end of the discharge stacking unit 101 may be integral with the right side surface 102d of the left beam 102. Similarly, the right stacking end of the discharge stacking unit 101 may be integral with the left side surface 103b of the right beam 103. That is to say, in the X direction, the position of the right side surface 102d coincides with the position of the left stacking end of the discharge stacking unit 101. In the X direction, the position of the left side surface 103b of the right beam 103 coincides with the position of the right stacking end of the discharge stacking unit 101.

As shown in FIG. 9, the operation unit 170, the holding mechanism 600, and the USB connector 901 are disposed on the left side of the image forming apparatus 100 in a concentrated manner. Furthermore, the right beam 103 is positioned rearward of the left beam 102. This improves the visual recognizability of the sheets S discharged and stacked on the discharge stacking unit 101. Furthermore, the ease of removing the sheets S from the discharge stacking unit 101 improves.

The size of the operation unit 170 can be increased while maintaining the size of the image forming apparatus 100 in the width direction (X direction). As a result, the operability of the operation unit 170 is improved. Furthermore, the visual recognizability of display information on the operation unit 170 is improved. That is to say, it is possible to achieve the visual recognizability of the sheets S in the discharge stacking unit 101, the ease of removing the sheets S, and the visual recognizability and the operability of the operation unit 170.

In the first embodiment, the image reading device 150 protrudes to the left side beyond the image forming unit 110. However, this is merely exemplary. The image reading device 150 may protrude to the right side beyond the image forming unit 110.

Second Embodiment

Figure 10:
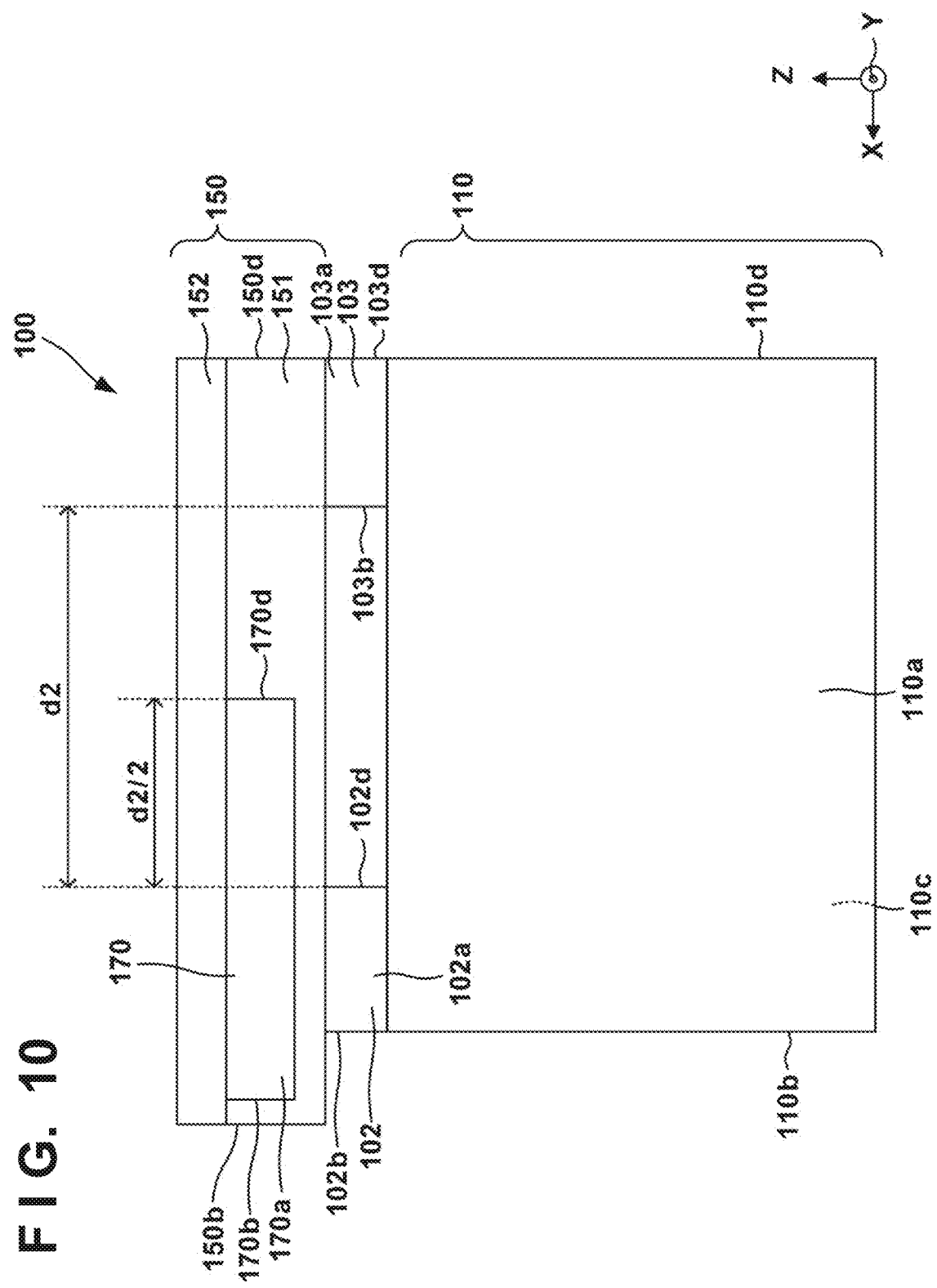
FIG. 10 is a front view illustrating a variation.

FIGS. 10 and 11 show a second embodiment that is a variation of the first embodiment. In particular, FIG. 10 is a front view showing the front side of the image forming apparatus 100 according to the second embodiment. FIG. 11 is a plan view of the image forming apparatus 100 according to the second embodiment. In particular, in the second embodiment, the operation unit 170 is expanded compared with the first embodiment. In the second embodiment, constituent elements common to the first embodiment are given the same reference signs, and a description thereof is omitted.

The left side surface 170b of the operation unit 170 is positioned on the left side relative to the left side surface 110b of the image forming unit 110. In the width direction of the image forming apparatus 100, the right side surface 170d of the operation unit 170 is disposed so as not to extend to the right side beyond a central position of the discharge stacking unit 101 having a width d2. In FIG. 10, as an example, the position of the left end of the discharge stacking unit 101 in the X direction coincides with the position of the right side surface 102d of the left beam 102, and the position of the right end of the discharge stacking unit 101 coincides with the position of the left side surface 103b of the right beam 103. Thus, the distance between the right side surface 102d of the left beam 102 (the left end of the discharge stacking unit 101) and the center of the discharge stacking unit 101 in the width direction of the image forming apparatus 100 is d/2. That is to say, it is sufficient that the distance L5 between the right side surface 102d of the left beam 102 (the left end of the discharge stacking unit 101) and the right side surface 170d of the operation unit 170 is equal to or shorter than d2/2.

In this manner, according to the second embodiment, it is possible to increase at least one of the display area and the operation area of the operation unit 170. Furthermore, the visual recognizability of the sheets S discharged to the upper side of the discharge stacking unit 101 and the ease of removing the sheets S may be lower than those of the first embodiment, but are still improved compared with conventional technologies. When the display region 811 of the operation unit 170 is expanded, the amount of display information increases. When the operation region 812 is expanded, the number of operation buttons and the like increase, and the operability is improved.

Third Embodiment

Figure 12:
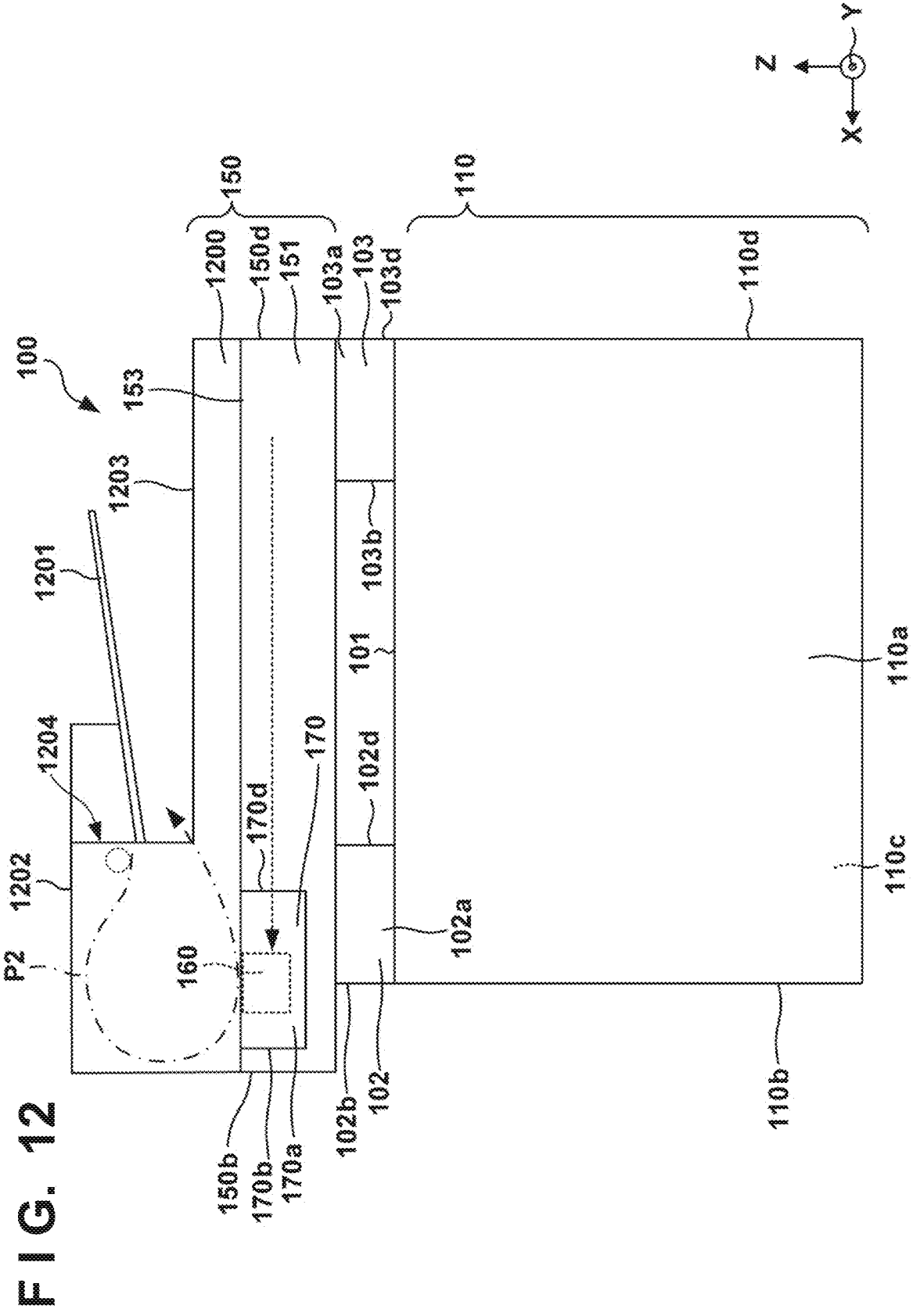
FIG. 12 is a front view illustrating a variation.
Figure 13:
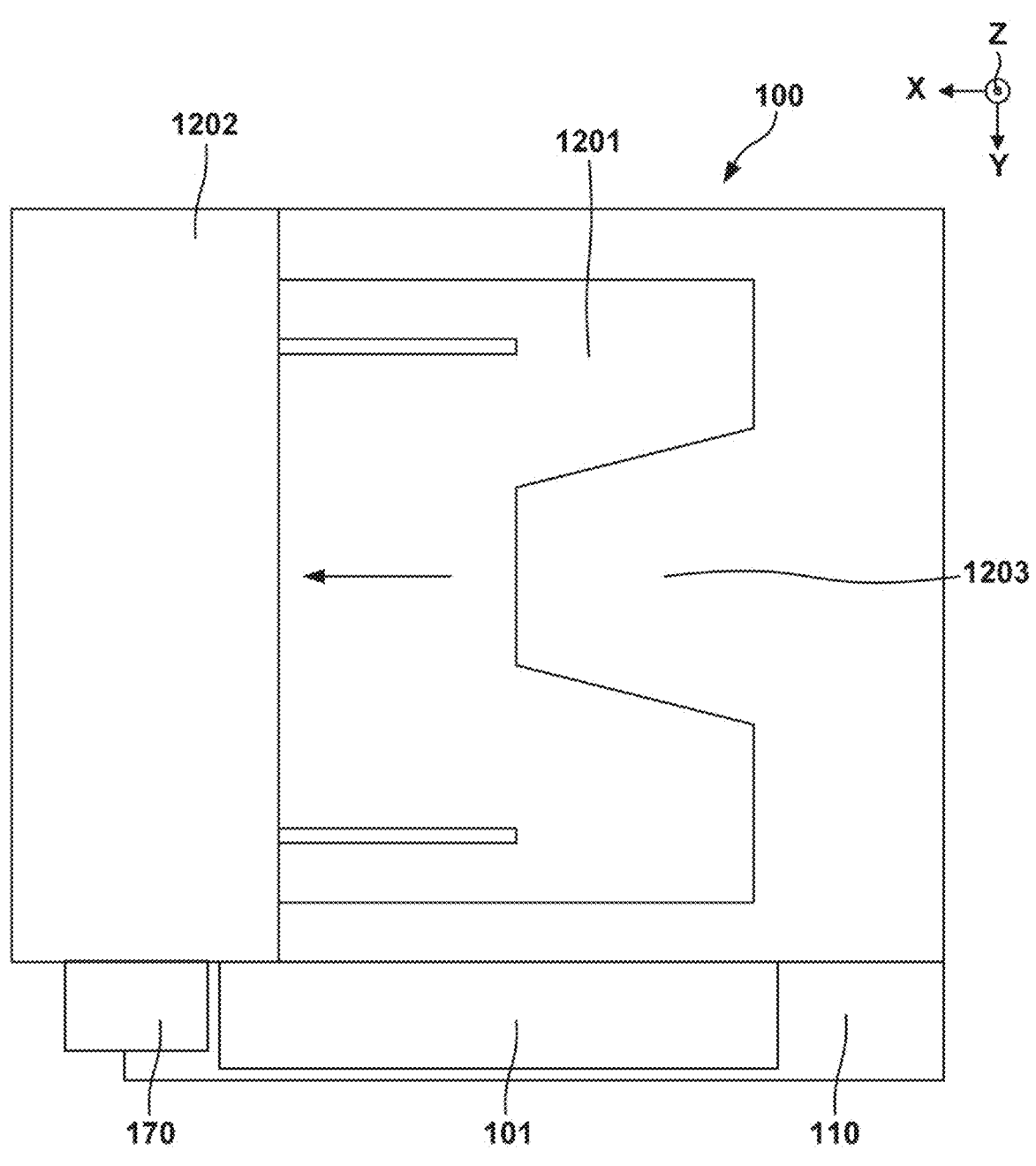
FIG. 13 is a plan view illustrating the variation.

FIGS. 12 and 13 show a third embodiment that is a variation of the first and second embodiments. In particular, FIG. 12 shows the front side of the image forming apparatus 100 according to the third embodiment. FIG. 13 is a plan view of the image forming apparatus 100 according to the third embodiment. In the third embodiment, an ADF 1200 is adopted in place of the cover 152. ADF is an abbreviation for Auto Document Feeder.

The image reading device 150 can also support an operation of skimming through a document, as a result of mounting the ADF 1200. In a fixed reading mode for reading a document placed on the platen glass 153, the image sensor 160 reads the document while moving in the width direction of the image reading device 150 (X direction). On the other hand, in a skimming mode, the image sensor 160 reads a document that is being conveyed by the ADF 1200 while stopping in the vicinity of the left end of the image reading device 150. Note that a configuration may be adopted in which the image sensor 160 is fixed in the vicinity of the right end of the image reading device 150 in both modes, and a light source that illuminates a document and an optical box that directs the light from the document to the image sensor 160 reciprocates in the X direction.

The ADF 1200 includes a feeding tray 1201 on which a document is stacked, a feeding unit 1202 for feeding the document, and a discharge tray 1203. When a read instruction is input through the operation unit 170, the image sensor 160 moves to a reading position, and the feeding roller of the feeding unit 1202 starts feeding the document stacked on the feeding tray 1201. The document enters the feeding unit 1202 from a feeding port 1204, and is conveyed along a conveyance path P2. The image sensor 160 reads the document passing through the reading position, and generates image data. The document is then discharged to and stacked on the discharge tray 1203.

If an instruction input through the operation unit 170 is a "copy" instruction, image data is transmitted to the image forming unit 110. The image forming unit 110 forms an image of the document on the sheet S, and discharges the sheet S to the discharge stacking unit 101.

The user faces the front side of the image forming apparatus 100, and performs operations on the operation unit 170. For this reason, a document insertion/removing direction of the ADF 1200 (the direction in which the user places a document on the feeding tray 1201 and the direction in which the user removes the document from the discharge tray 1203) is parallel to the Y direction. The direction in which the user visually recognizes and removes the sheets S on the discharge stacking unit 101 is also generally parallel to the Y direction. This suggests that the user (worker) does not need to make any major change to the sight line. Thus, the visual recognizability and the operability of the document, and the visual recognizability and the operability of a copied article are improved.

Fourth Embodiment

Figure 14:
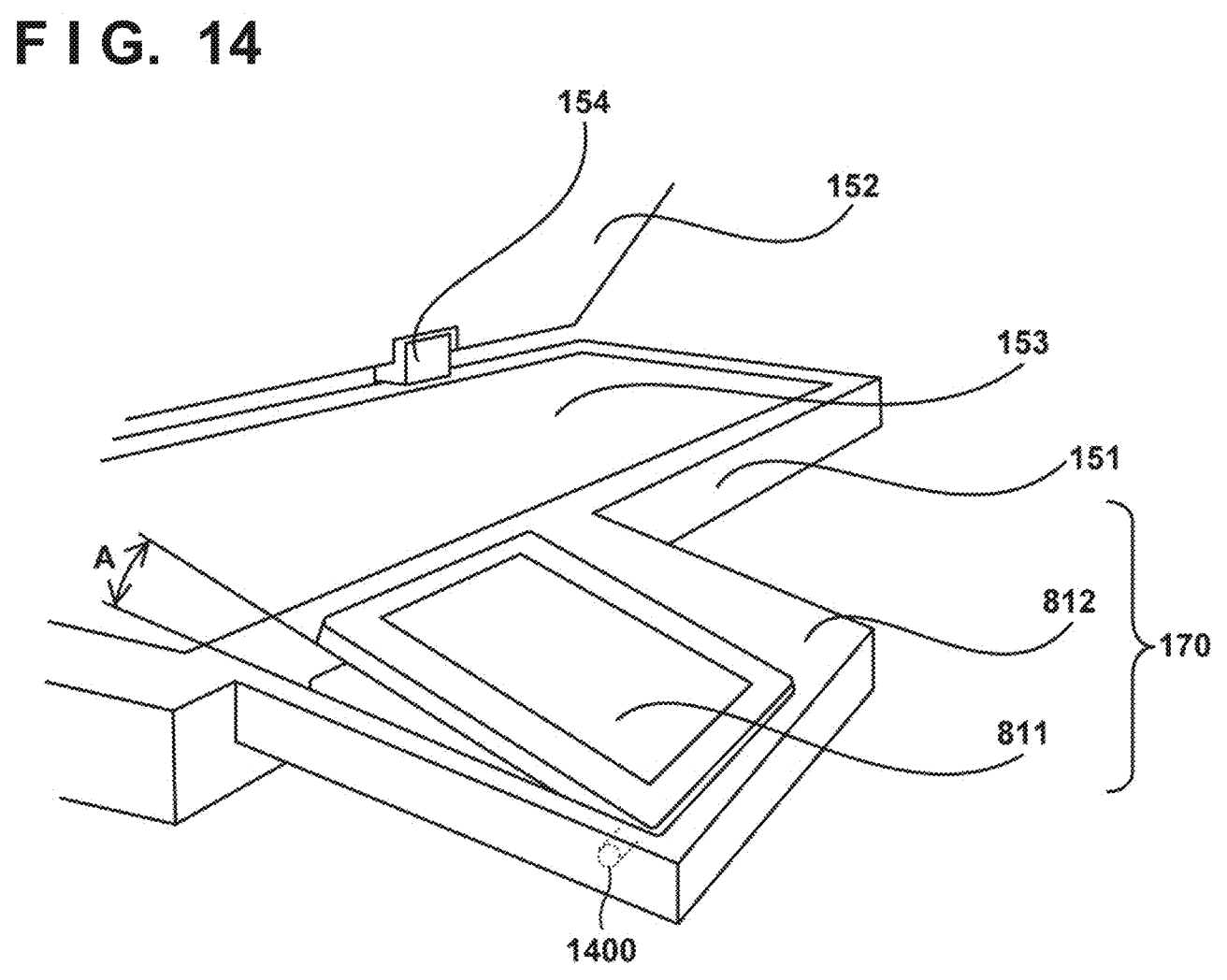

As shown in FIG. 14, the operation unit 170 may have a tilt mechanism 1400. The tilt mechanism 1400 can be realized by a torque, a hinge, or the like. The tilt mechanism 1400 can be realized by a rotation shaft about which the operation unit 170 rotates, and a friction mechanism for holding the operation unit 170 at a fixed position, for example. In FIG. 14, a tilt angle A of the display region 811 can be suitably adjusted using the tilt mechanism. The operation region 812 may be realized by a touch sensor. In this case, the operation region 812 may overlap the display region 811. That is to say, the operation unit 170 may be realized as a touch panel.

Others

The left beam 102 and the right beam 103 are examples of a supporting member that is provided between the image reading device 150 and the image forming unit 110 in the height direction of the image forming apparatus 100, and supports the image reading device 150 disposed above the image forming unit.

The discharge stacking unit 101 is an example of a stacking unit that is provided between the image reading device 150 and the image forming unit 110 in the height direction of the image forming apparatus 100, and is disposed adjacent to the supporting member, and on which sheets discharged from the image forming unit 110 are stacked. A discharge roller 108 is an example of a discharge unit that is provided in the image forming unit 110, and discharges sheets from the image forming unit 110 to the stacking unit. The operation unit 170 accepts input for operating at least one of the image forming unit 110 and the image reading device 150, and is supported by the image reading device 150, on the front side of the image forming apparatus 100.

In this manner, the operation unit 170 is offset with respect to the stacking unit and the image forming unit 110.

As a result, it is possible to achieve all of the visual recognizability of sheets discharged to the stacking unit, the ease of removing the sheets, the visual recognizability and the operability of the operation unit 170.

The hinges 155 are an example of a hinge mechanism for rotatably supporting the image reading device 150 relative to the image forming unit 110. By the image reading device 150 being spaced apart from the image forming unit 110, the user may be able to more easily remove sheets from the stacking unit.

The operation unit 170 is disposed to be offset with respect to the stacking unit and the image forming unit 110. As a result, it is possible to achieve all of the visual recognizability of sheets discharged to the stacking unit, the ease of removing the sheets, the visual recognizability of the operation unit 170, and the operability of the operation unit. In particular, in the width direction of the image forming apparatus 100, the distance between the right side surface 170d, which is the second end portion, and the first stacking end is smaller than the distance between the second end portion and the second stacking end, and thus the operation unit is unlikely to hinder the visual recognizability of the stacking unit. The position of the first stacking end of the stacking unit is substantially the same as the position of the right side surface 102d of the left beam 102.

As shown in FIGS. 10 and 11, the right side surface 170d may be positioned between the first stacking end and the left side surface 170b, which is a first end portion, in the width direction of the image forming apparatus 100. Accordingly, it is possible to increase the area of the operation unit 170. Accordingly, the visual recognizability and the operability of the operation unit 170 may be improved.

As shown in FIGS. 10 and 11, in the width direction of the image forming apparatus 100, the right side surface 170d may be positioned between the first stacking end and the second stacking end. Accordingly, it is possible to increase the area of the operation unit 170. Accordingly, the visual recognizability and the operability of the operation unit 170 may be improved.

As shown in FIGS. 1 and 9-10, the distance between the right side surface 170d and the first stacking end (e.g., L5) is shorter than the distance between the right side surface 170d and the central position of the stacking unit (e.g., d2/2). Accordingly, the visual recognizability of the stacking unit and the ease of removing sheets may be improved.

As shown in FIG. 5, the discharge unit may discharge sheets in a direction from the rear side of the image forming apparatus 100 to the front side. Accordingly, the user (operator) can remove sheets from the front side of the image forming apparatus 100, and the ease of removing sheets is improved.

The image reading device 150 may include a first side surface (e.g., the left side surface 150b) and a second side surface (e.g., the right side surface 150d). As shown in FIGS. 1 and 9 to 12, the distance between the left side surface 150b and the first stacking end (e.g., L7) may be shorter than the distance between the right side surface 150d and the first stacking end (e.g., L8). It suffices for the left side surface 150b to be positioned outside the image forming unit 110. Accordingly, the image reading device 150 can read a fixed size document, and the size of the image forming unit 110 can be reduced.

The ADF 1200 is an example of a document feeding device that feeds a document to the upper side of a translucent plate one sheet at a time. The distance between the feeding port 1204 of the document feeding device and the left side surface 170b of the operation unit 170 may be shorter than the distance between the feeding port 1204 and the right side surface 110d. In this manner, also in the image forming apparatus 100 that adopts a document feeding device, the visual recognizability of sheets in the stacking unit and the ease of removing the sheets are improved.

The operation unit 170 may be integrated with the case of the image reading device 150. This may improve the efficiency of a manufacturing process and an assembly process of the operation unit.

The supporting member may include the left beam 102 and the right beam 103 that support the image reading device 150. By adopting the supporting member in this manner, a space can be provided between the image forming unit 110 and the image reading device 150, and the stacking unit can be provided in the space. In addition, a space is ensured above the stacking unit by the supporting member, and thus the visual recognizability of the sheets and the ease of removing the sheets may be further improved.

As shown in FIG. 9, the difference between these two distances is denoted by d1. In addition, the operation unit is disposed closer to a first supporting portion than to a second supporting portion. For this reason, the first supporting portion needs to support a larger weight. Thus, the first supporting portion may be larger than the second supporting portion and extend closer to the front side. On the other hand, by receding the second supporting portion relative to the first supporting portion, the user can easily remove the sheets from the stacking unit.

A connector may be provided on the first supporting portion positioned on the front side relative to the second supporting portion. This makes it easy for the user to access the connector.

The holding mechanism 600 is an example of a holding unit that holds the image reading device 150 at a second position. This may enable the user to easily hold the image reading device 150 and also improve the ease of removing sheets.

The holding mechanism 600 may include a link mechanism that includes the fixed-end rotation shaft 601 fixed to the image reading device 150, the fixed-end rotation shaft 605 fixed to the supporting member, and a link member connected these shafts (e.g., the upper coupling rod 602, the lower coupling rod 604, and the free-end rotation shaft 603). By adopting the link mechanism, the size of the holding unit may be reduced.

The operation unit 170 may include a tilt mechanism that is tilted between a first state where the operation unit 170 is standing and a second state in which the operation unit 170 is lying. As illustrated in FIG. 14, by adopting the tilt mechanism, the user can adjust the visual recognizability and the operability of the operation unit.

As shown in FIGS. 2, 4 to 7, 9, 11, 13, and 14, the front side of the operation unit 170 may protrude outward beyond the front side of the image reading device 150. This may make it possible to increase the area of the operation unit, and further improve the operability and the visual recognizability of the operation unit.

As shown in FIG. 9, the front surface 110a of the image forming unit 110 may protrude outward beyond the front surface 150a of the image reading device 150. This improves the visual recognizability of sheets stacked on the stacking unit and the ease of removing the sheets.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-193850, filed Nov. 14, 2023 which is hereby incorporated by reference herein in its entirety.

What is claimed is:

1. An image forming apparatus comprising:
an image reading device that reads a document;
an image forming unit that is provided below the image reading device, and forms a toner image on a sheet;
a supporting member that is provided between the image reading device and the image forming unit in a height direction of the image forming apparatus, and supports the image reading device disposed above the image forming unit;
a stacking unit on which the sheet is stacked, the stacking unit being provided between the image reading device and the image forming unit in the height direction and being disposed adjacent to the supporting member in a width direction orthogonal to the height direction, the stacking unit including a first stacking end and a second stacking end in the width direction;
a discharge unit that is provided in the image forming unit, and is configured to discharge the sheet to the stacking unit in a direction from a rear side of the image forming apparatus to a front side of the image forming apparatus in a depth direction which is orthogonal to both the height direction and the width direction; and
an operation unit that is configured to accept input for operating at least one of the image forming unit and the image reading device, and is supported by the image reading device, on a side of the front side of the image forming apparatus in the depth direction,
wherein the supporting member includes a hinge which supports the image reading device such that the image reading device is rotatable, relative to the image forming unit, between a first position and a second position, the first position being a position at which a front side of the image reading device on a side of the front side of the image forming apparatus in the depth direction is closer to the image forming unit than at the second position, the second position being a position at which the front side of the image reading device is farther from the image forming unit than at the first position,
wherein a first end surface of the operation unit in the width direction is provided outside of one side surface of the image forming unit in the width direction, and
wherein a second end surface of the operation unit that opposes the first end surface in the width direction is provided between the first stacking end and the second stacking end in the width direction, exclusive of the positions of the first and second stacking ends.

2. The image forming apparatus according to claim 1, wherein
the distance between the second end surface of the operation unit and the first stacking end is shorter than a distance between the second end surface of the operation unit and a central position of the stacking unit, in the width direction of the image forming apparatus.

3. The image forming apparatus according to claim 1, wherein
the image reading device includes a first side surface and a second side surface opposed to the first side surface in the width direction,
a distance between the first side surface of the image reading device and the first stacking end is shorter than a distance between the second side surface of the image reading device and the first stacking end, and
the first side surface of the image reading device is positioned outside the one side surface of the image forming unit, in the width direction.

4. The image forming apparatus according to claim 1, wherein
the image reading device includes:
a translucent plate configured to support the document and having a light-transmitting property,
an image sensor configured to read the document supported by the translucent plate, and
a document feeding device that feeds the document to an upper side of the translucent plate one sheet at a time, the document feeding device being configured to rotate relative to the translucent plate between a covering position at which the document feeding device covers the translucent plate and an exposing position at which the document feeding device does not cover the translucent plate to expose the translucent plate to an outside of the image forming apparatus,
wherein, in the width direction, a distance between a feeding port of the document feeding device and the first end surface of the operation unit is shorter than a distance between the feeding port of the document feeding device and the other side surface opposing the one side surface of the image forming unit in the width direction.

5. The image forming apparatus according to claim 1, wherein
the operation unit is integrated with a case of the image reading device.

6. The image forming apparatus according to claim 1, wherein the supporting member includes a first supporting portion and a second supporting portion that support the image reading device, a distance between the first supporting portion and the operation unit is shorter than a distance between the second supporting portion and the operation unit, in the width direction, and the stacking unit is disposed between the first supporting portion and the second supporting portion in the width direction.

7. The image forming apparatus according to claim 6, wherein in the depth direction, a distance between the first supporting portion and a front surface of the image reading device on a side of the front side of the image forming apparatus in the depth direction is shorter than a distance between the second supporting portion and the front surface of the image reading device.

8. The image forming apparatus according to claim 7, further comprising a connector port that is provided on a front side of the first supporting portion on a side of the front side of the image forming apparatus in the depth direction, and to which a removable storage device is connectable.

9. The image forming apparatus according to claim 1, further comprising a holding unit configured to hold the image reading device at the second position.

10. The image forming apparatus according to claim 9, wherein the holding unit includes a link mechanism that includes a first fixed end portion fixed to the image reading device, a second fixed end portion fixed to the supporting member, an upper link member connected to the first fixed end portion, a lower link member connected to the second fixed end portion, and a pivot joint at which the upper link member and the lower link member are joined and pivot relative to each other.

11. The image forming apparatus according to claim 1, wherein a front surface of the operation unit on a side of the front side of the image forming apparatus in the depth direction is provided outside of a front surface of the image reading device on the side of the front side of the image forming apparatus, in the depth direction.

12. The image forming apparatus according to claim 11, wherein a front surface of the image forming unit on the side of the front side of the image forming apparatus in the depth direction is provided outside the front surface of the image reading device, in the depth direction.

13. The image forming apparatus according to claim 1, wherein the supporting member includes a first supporting portion and a second supporting portion that support the image reading device, and wherein a position of the first stacking end in the width direction coincides with a position of an inside surface of the first supporting portion in the width direction, and a position of the second stacking end coincides with a position of an inside surface of the second supporting portion in the width direction.

* * * * *